(12) United States Patent
Jeng et al.

(10) Patent No.: US 7,830,360 B2
(45) Date of Patent: Nov. 9, 2010

(54) INERTIAL SENSING INPUT APPARATUS AND METHOD

(75) Inventors: Sheng-Wen Jeng, Tainan (TW); Shun-Nan Liou, Kaohsiung (TW); Ming-Jye Tsai, Hsinchu County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 858 days.

(21) Appl. No.: 11/674,910

(22) Filed: Feb. 14, 2007

(65) Prior Publication Data
US 2008/0134783 A1 Jun. 12, 2008

(30) Foreign Application Priority Data
Dec. 12, 2006 (TW) .............................. 95146514 A

(51) Int. Cl.
*G09G 5/00* (2006.01)
(52) U.S. Cl. ................... 345/156; 345/158; 345/163
(58) Field of Classification Search .......... 345/156–172
See application file for complete search history.

(56) References Cited

U.S. PATENT DOCUMENTS

| | | | |
|---|---|---|---|
| 4,787,051 A | 11/1988 | Olson | |
| 5,181,181 A * | 1/1993 | Glynn | 702/141 |
| 5,627,565 A * | 5/1997 | Morishita et al. | 345/158 |
| 5,825,350 A | 10/1998 | Case, Jr. et al. | |
| 5,898,421 A | 4/1999 | Quinn | |
| 2008/0134783 A1* | 6/2008 | Jeng et al. | 73/514.01 |
| 2008/0134784 A1* | 6/2008 | Jeng et al. | 73/514.01 |

FOREIGN PATENT DOCUMENTS

TW 526975 4/2003

* cited by examiner

*Primary Examiner*—Vijay Shankar
(74) *Attorney, Agent, or Firm*—WPAT., P.C.; Justin King

(57) ABSTRACT

An inertial sensing input apparatus is disclosed, which includes: an accelerometer module, capable of detecting accelerations with respect to a Cartesian coordinate system of X-, Y-, and Z-axes; and a gyroscope, used for detecting a rotation measured with respect to the Z-axis. By the aforesaid input apparatus, an input method can be provided which comprises steps of: (a) defining base signals with respect to each of such sensing elements; (b) detecting and determining whether Z-axis accelerations are varying; (c) enabling the input apparatus to enter a surface (2D) operating mode while no acceleration varying is detected along the Z axis; (d) enabling the input apparatus to enter a space (3D) operating mode while acceleration varying is detected along the Z axis.

14 Claims, 4 Drawing Sheets

INERTIAL SENSING INPUT APPARATUS AND METHOD

FIELD OF THE INVENTION

The present invention relates to an inertial sensing input apparatus and method, and more particularly, to an inertial sensing input apparatus configured with accelerometer and gyroscope, capable of adapting itself to be operative no matter the input apparatus is being held to operate on a planar surface or in a free space by selectively enabling the input apparatus to operate in a mode of two-dimensional (2D) detection or in a mode of three-dimensional (3D) detection. In two-dimensional (2D) detection mode, the gyroscope is activated to detect a rotation of the input apparatus caused when the input apparatus is being held to move and thus generates an angular velocity signal correspondingly for compensating the unconscious rotation caused by a human operation. Also, the interferences caused by the electronic noises generated from the accelerometer or the electronic circuit are removed by thresholding and iterative averaging algorithms, so that the inertial sensing input apparatus of the invention is freed from the shortcomings of prior-art inertial input apparatus using only accelerometer and it is a device that can be handle smoothly and naturally.

BACKGROUND OF THE INVENTION

Currently, there are many kinds of computer mouse available on the market, which are the most popular human-machine interface used by computers as cursor-control device. There are three basic types of mice, which are mechanical mouse, LED optical mouse and laser mouse with respect to the different means of detection. However, since the aforesaid mice are constrained to use on a working surface that the condition of the working surface will have great influence upon the detection of the aforesaid mice as it will affect the ball rolling of the mechanical mouse and the shadow generating of the two optical mice, they can no longer meet the requirements of today's video games and multimedia applications, which desire to have an cursor-control device capable operated on a planar surface and in the air. As for the presentation device, it is usually a remote control device capable of enabling a lecturer to cycle through transparencies as it is designed with press-keys and relating circuits for controlling operations such as turning on/off, scrolling up/down and page forwarding/backwarding, etc. Nevertheless, as more and more people like to give his/her presentation by the use of his/her personal computer, it is more and more common to have to connect a presentation device to a computer while preparing a presentation, causing the presentation device and usually a computer mouse to coexist in a same space at the same time that the wiring of the two devices can be messy and troublesome.

There are already several cursor-control devices integrating functions of the computer mouse and the presentation device. However, the control methods adopted thereby are still similar to those conventional computer mice and thus suffering the same limitations. As for the inertial/gravity mouse which are being aggressively studied, it is still troubled by many technical difficulties and thus remains to be improved.

There are many researches relating to inertial mouse. One of which is an inertial mouse disclosed in U.S. Pat. No. 4,787,051, entitled "Inertial Mouse System", as seen in FIG. 1. In FIG. 1, a hand-held inertial mouse 10 for a computer is provided, which includes accelerometer 14, 16 and 18, each capable of generating an output signal of magnitude proportional to the acceleration (or deceleration) of mouse 10 in a two perpendicular direction as indicated by the double ended arrows on the accelerometers of FIG. 1. A pair of these three accelerometers, i.e. the accelerometers 14 and 18, are positioned respectively at a side of the accelerometer 16, to detect acceleration along one axis, such as the Y-axis of a 2-D Cartesian coordinates of X, Y axes, such that an angular acceleration of the mouse 10 about the Y-axis of rotation causes representative differences in the magnitudes of the output signals of the two accelerometers 14, 18 that the difference between the magnitudes of the output signals of accelerometers 14 and 18 is proportional to the angular acceleration of mouse 10 the Y-axis, and the angular displacement of mouse 10 of the Y-axis is therefore proportional to the second integral of this magnitude difference. Hence, the translational velocity and displacement of the mouse 10 can be determined by integrating the accelerometer output signals and the angular velocity and displacement of the mouse 10 can be determined by integrating the difference between the output signals of the accelerometer pairs 14, 18. However, as the angular displacement of the mouse 10 is indirectly acquired by twice integrating the difference between the output signals of accelerometers 14 and 18, the margin of error might be huge. Moreover, Since the accelerometers 14, 16, 18 are only positioned to measure accelerations (or decelerations) of mouse 10 in a two perpendicular direction, i.e. the X-axis and Y-axis, the inertial mouse can only determine movement thereof while being held to move on a surface.

Please refer to FIG. 2, which is an expanded perspective view of an input device, disclosed in U.S. Pat. No. 5,898,421, entitled "Gyroscopic Pointer and Method". The hand-held input device, having an inertial gyroscopic element 110 arranged therein, is capable of being used in free space, employing the inertial gyroscopic element 110 for detecting angular velocity of a user's hand and thus, by the signal transmission of the interface 180, defining movements of a cursor displayed on a screen of an interactive computer. In one embodiment of the aforesaid patent as that shown in FIG. 2, the inertial gyroscopic element 110, arranged inside the hand-held input device, is driven to rotate by power provided from a wall adapter 190 and is pivotally coupled to an inner frame 170 by a pair of coaxial gimbals 115, 120 while pivotally coupling to an outer frame 160 by another pair of coaxial gimbals 140, 145 whose axis is perpendicular to that of the gimbals 115, 120. As there is only a gyroscopic element 110 configured in the hand-held input device, it is only suitable to be used in a free space and is not able to operate on a planar surface. Moreover, it is conceivable that the referring mouse is comparably bulky and suffers a high margin of error as gyroscopic element 110 is mechanically coupled inside the hand-held input device.

Please refer to FIG. 3, which shows a pointing device disclosed in U.S. Pat. No. 5,825,350, entitled "Electronic Pointing Apparatus and Method". The foregoing pointing apparatus 100 is capable of controlling cursor movement and selecting elements on a computer screen no matter it is being held to move on a planar surface or in a free space, in which two gyroscopic elements, respectively coupled to a gyroscope printed circuit board 452, are provided for indicating yaw and pitch movements of the pointing apparatus in free space, and a mouse ball 260 and relating mouse ball encoders are provided for indicating movement of the pointing device on a surface. The switching of the pointing apparatus 100 between a two-dimensional mode and a three-dimensional mode is enabled by a ball locking mechanism, which is comprised of a lever 472 and a plunger 270, connected to the lever 472. That is, when the pointing apparatus 100 is being held to move on a planar surface, the plunger 270 that extends out of an opening of the housing is pushed through the opening to a position substantially level with the surface of the bottom side and thus lifts the lever 472 for freeing the mouse ball 260, so that the pointing apparatus 100 is being enabled to operate in the two-dimensional mode, and when the pointing apparatus 100 is being lift and move in a free space, the plunger 270 will drop and thus pull the lever 472 to press down while enabling the elevated region 506 to press upon the mouse ball 260 for holding the same from rolling freely, so that the pointing apparatus 100 is being enabled to operate in the three-dimensional mode. Although the aforesaid pointing apparatus is operable no matter it is being held to move on a surface or in a free space, it is still not preferred, since when the pointing apparatus 100 is being lift and move in a free space, it is more than likely that the cooperative effort of the lever 472 and its elevated region 506 can not precisely hold the mouse ball 260 still that the mouse ball 260 is intended to roll or move unexpected and causes the pointing apparatus 100 to generate unwanted signals interfering the cursor movement on the screen.

There are some consumer products, similar to the pointing apparatus shown in FIG. 3, currently available on the market that each can be considered as a standard LED optical mouse with addition gyroscope arranged therein and is different from that of FIG. 3 by replacing the mouse ball 260 with an optical module and thus the problem caused by the unexpected rolling of the mouse ball is prevented. However, such optical gyroscope mouse is just a housing accommodating two separated and independent modules, one acting as a common LED optical mouse while sitting on a surface, and another acting as gyroscopic element to detect the angular velocity of rotation while operating in free space, that the circuit of the LED optical module has no relation with the gyroscopic circuit. Therefore, not only such optical gyroscope mouse can not benefit from the design since it can only provide basic functions the same as the addition of a standard LED optical mouse and a gyroscope, but also it is a heavy, bulky and complicated device.

Please refer to FIG. 4, which is a gravity mouse disclosed in TW Pat. Appl. No. 90221010. As the gravity mouse is being held to move and used for controlling the movement of a cursor displayed on a monitor of a personal computer (PC), its gravity sensor (i.e. G sensor) with potential energy measuring ability is enable to detect the potential energy variation of the gravity mouse caused by a movement of the same while transmitting a signal generated accordingly to its micro process unit (MCU) to be processed. As the MCU is able to detect the duration of the movement while receiving an acceleration caused by the movement, it can generate a control signal for controlling the cursor to move accordingly with respect to the duration and the acceleration. It is known that the movements of the cursor is determined by a integration operation performed based upon the detections of at least two accelerometers configuring in the gravity mouse at two perpendicular axes. Thus, as the movement is defined by integration which is prone to accumulate error, the positioning of the cursor might not be accurate.

Therefore, it is in need of an inertial sensing input apparatus and method that is accurate and convenience to operate no matter it is being held to move on a planar surface or in a free space, by which not only the unconscious rotation caused by a human operation as it is being held in a human hand is compensated, but also the interferences caused by the electronic noises generated from the accelerometer can be prevented for freeing the inertial sensing input apparatus of the invention from the shortcomings of prior-art inertial input apparatus using only accelerometers.

SUMMARY OF THE INVENTION

In view of the disadvantages of prior arts, the primary object of the present invention is to provide an inertial sensing input apparatus, configured with accelerometer and gyroscope for adapting itself to be operative no matter the input apparatus is being held to operate on a surface or in a free space by selectively enabling the input apparatus to operate in a mode of two-dimensional (2D) detection or in a mode of three-dimensional (3D) detection, in which the gyroscope is activated to detect a rotation of the input apparatus caused when the input apparatus is being held to move and thus generates an angular velocity signal correspondingly for compensating the unconscious rotation caused by a human operation. Also, the interferences caused by the electronic noises generated from the accelerometer or the electronic circuit are removed by thresholding and iterative averaging algorithms, so that the inertial sensing input apparatus of the invention is freed from the shortcomings of prior-art inertial input apparatus using only accelerometer and it is a device that can be handle smoothly and naturally.

To achieve the above object, the present invention provides an inertial sensing input apparatus, comprising:

an accelerometer module, structured with at least three accelerometers for detecting accelerations in three perpendicular directions with respect to a Cartesian coordinate system of X-, Y-, and Z-axes; and a gyroscope, used for detecting a rotation measured with respect to the Z-axis; wherein, an angle of rotation is obtained by integrating the angular velocity of the rotation detected by the gyroscope while calculating a centrifugal force as well as a centripetal force exerting upon the inertial sensing input apparatus at the moment of the rotation so as to using those for compensating acceleration signals measured along the X-axis and the Y-axis and thereafter defining movements of an object displayed on a screen of an interactive computer by the use of the compensated acceleration signals.

Preferably, one accelerometer of the acceleration module, referring hereinafter as a Z-axis accelerometer, is being enabled for detecting an acceleration with respect to the Z-axis while the inertial sensing input apparatus is experiencing an up-and down displacement and thus selecting an operating mode for the inertial sensing input apparatus accordingly.

Preferably, the inertial sensing input apparatus is enabled to enter a surface (2D) operating mode while no acceleration varying is detected along the Z axis, whereas two accelerometers of the acceleration module, referring hereinafter as an X-axis accelerometer and a Y-axis accelerometer, are activated accordingly to detect an X-axis acceleration and a Y-axis acceleration in respective and thus generate an X-axis acceleration signal and a Y-axis acceleration signal correspondingly.

Preferably, the acceleration module is a device selected from the group consisting of a modulized structure, a combined structure configuring with accelerometers for measuring three axes of a space respectively and independently, and the combination thereof.

To achieve the above object, the present invention further provide an inertial sensing input method, comprising the steps of:

(a) zeroing an X-axis accelerometer, a Y-axis accelerometer, a Z-axis accelerometer and a gyroscope of an inertial sensing input apparatus at rest for defining BaseValue signals (BVs) with respect to those sensing elements, whereas the X-axis accelerometer, the Y-axis accelerometer, the Z-axis accelerometer are being arranged to detect accelerations of an inertial sensing input apparatus in three perpendicular directions with respect to a Cartesian coordinate system of X-, Y-, and Z-axes;

(b) using the Z-axis accelerometer to detect and determine whether a Z-axis acceleration of the inertial sensing input apparatus measured along the Z-axis of the Cartesian coordinate system is varying during a specified period of time;

(c) enabling the inertial sensing input apparatus to enter a surface (2D) operating mode while no acceleration varying is detected along the Z axis, whereas the X-axis accelerometer and the Y-axis accelerometer are activated accordingly to detect an X-axis acceleration and a Y-axis acceleration in respective and thus generate an X-axis acceleration signal and a Y-axis acceleration signal correspondingly; and (d) enabling the input apparatus to enter a space (3D) operating mode while acceleration varying is detected along the Z axis, whereas the gyroscope is activated for detecting a rolling of the inertial sensing input apparatus while generating an angular velocity signal accordingly and the Y-axis accelerometer is activated for detecting a pitch of the inertial sensing input apparatus while generating another Y-axis acceleration signal accordingly.

Preferably, the step (b) of the method further comprises the step of:

defining the Z-axis acceleration of the inertial sensing input apparatus measured along the Z-axis as a motion signal and thus comparing the motion signal with the BVz of the Z-axis accelerometer so as to determining whether the acceleration of the inertial sensing input apparatus measured along the Z-axis is varying during the specified period of time.

Preferably, the step (C) of the method, in that the inertial sensing input apparatus is enabled to operate at the surface (2D) operating mode, further comprises the step of:

(c1) using the gyroscope to detect an unconscious rotation caused by a human operation as the inertial sensing input apparatus is being held to move on a surface in a human hand while generating an angular velocity signal accordingly, and thus using the angular signal for compensating the X-axis acceleration signal and the Y-axis acceleration signal.

Preferably, the compensating of the X-axis acceleration signal and the Y-axis acceleration signal, as that of step (c1), further comprises steps of:

(c11) integrating angular velocity of the inertial sensing input apparatus with respect to the angular velocity signal so as to obtain an angle of rotation; and (c12) detecting a centrifugal force at a tangent direction as well as a centripetal force exerting upon the inertial sensing input apparatus at the moment of the rotation.

Preferably, the centrifugal force is detected by the X-axis accelerometer so as to be used thereby along with the displacement measured at the X-axis detected thereby to generate the X-axis acceleration signal; and the centripetal force is detected by the Y-axis accelerometer so as to be used thereby along with the displacement measured at the Y-axis detected thereby to generate the Y-axis acceleration signal.

Preferably, the rotation angle, the centrifugal force and the centripetal force acquired by the gyroscope are used in a calculation for canceling out a rotation error contained in a combined acceleration signal integrating the X-axis and the Y-axis acceleration signals, and thus by the calculation, an rotation error caused by the unconscious rotation is compensated.

Preferably, the step of compensating the X-axis acceleration signal and the Y-axis acceleration signal further comprises the steps of:

calculating the X-axis acceleration caused by an displacement of the inertial sensing input apparatus at the X-axis by subtracting effect of the centrifugal force from the acceleration detected by the X-axis accelerometer;

calculating the Y-axis acceleration caused by an displacement of the inertial sensing input apparatus at the Y-axis by subtracting effect of the centripetal force from the acceleration detected by the X-axis accelerometer; and compensating the X-axis acceleration signal and the Y-axis acceleration signal.

Preferably, the compensating of the X-axis acceleration signal and the Y-axis acceleration signal is achieved by the following formula:

$$\begin{bmatrix} g_{cx} \\ g_{cy} \end{bmatrix} = \begin{bmatrix} \cos\theta & \sin\theta \\ -\sin\theta & \cos\theta \end{bmatrix} \times \begin{bmatrix} g_{rx} \\ g_{ry} \end{bmatrix}$$

wherein $g_{cx}$ is the acceleration measured along the X-axis after being compensated;

$g_{cy}$ is the acceleration measured along the Y-axis after being compensated;

θ is the angle of rotation;

$g_{rx}$ is the X-axis acceleration caused by an displacement of the inertial sensing input apparatus at the X-axis; and $g_{cy}$ is the Y-axis acceleration caused by an displacement of the inertial sensing input apparatus at the Y-axis.

Preferably, after the (c1) step, the method further comprises the step of:

double integrating the compensated X-axis and the Y-axis acceleration signals to obtain a displacement for using the same to define movements of an object displayed on a screen of an interactive computer.

Preferably, the step (C) of the method, in that the inertial sensing input apparatus is enabled to operate at the surface (2D) operating mode, further comprises the step of:

(c13) suspending the detecting based on the zeroing of step (a) and examining whether a plurality of successive X-axis and the Y-axis acceleration signals, stored in advanced in the inertial sensing input apparatus, are all fallen inside a threshold range;

(c14) averaging the plural successive X-axis and the Y-axis acceleration signals and replacing the BVs by the averaged X-axis and the Y-axis acceleration signals in respective when all of which fall inside the threshold range; and (c15) performing no addition operation when all of which are not fallen inside the threshold range.

Preferably, the amount of the successive X-axis and the Y-axis acceleration signals being stored in the inertial sensing input apparatus is dependent upon the size of the apparatus as well as actual requirement.

Preferably, the threshold range is dependent upon the size of the apparatus as well as actual requirement.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
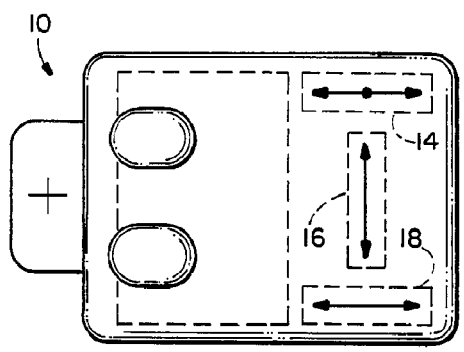
FIG. 1 shows an inertial mouse disclosed in U.S. Pat. No. 4,787,051, entitled "Inertial Mouse System".
Figure 2:
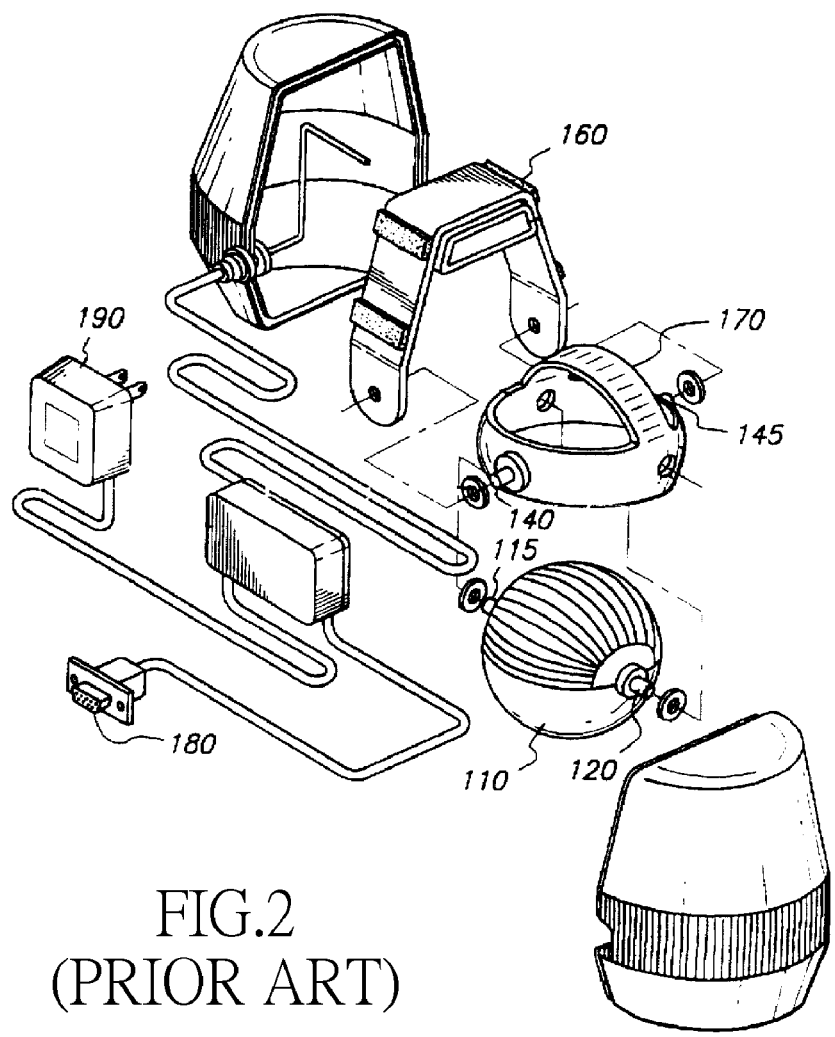
FIG. 2 is an expanded perspective view of an input device, disclosed in U.S. Pat. No. 5,898,421, entitled "Gyroscopic Pointer and Method".
Figure 3:
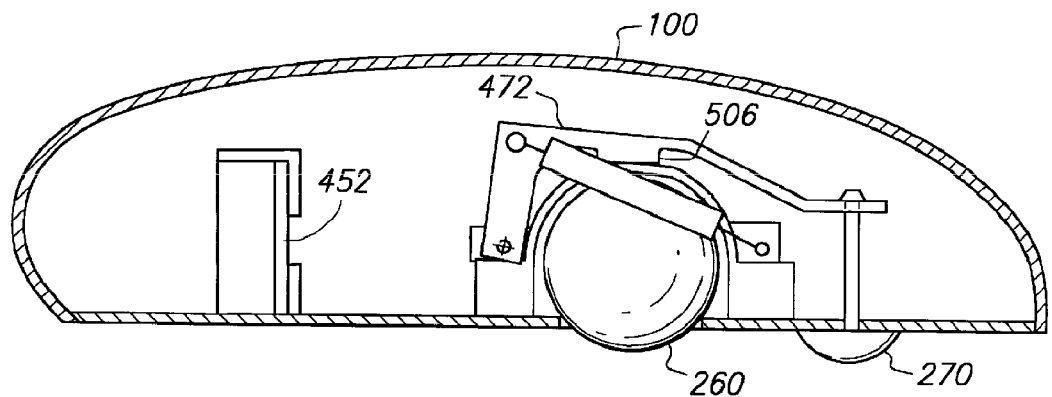
FIG. 3 shows a pointing device disclosed in U.S. Pat. No. 5,825,350, entitled "Electronic Pointing Apparatus and Method".
Figure 4:
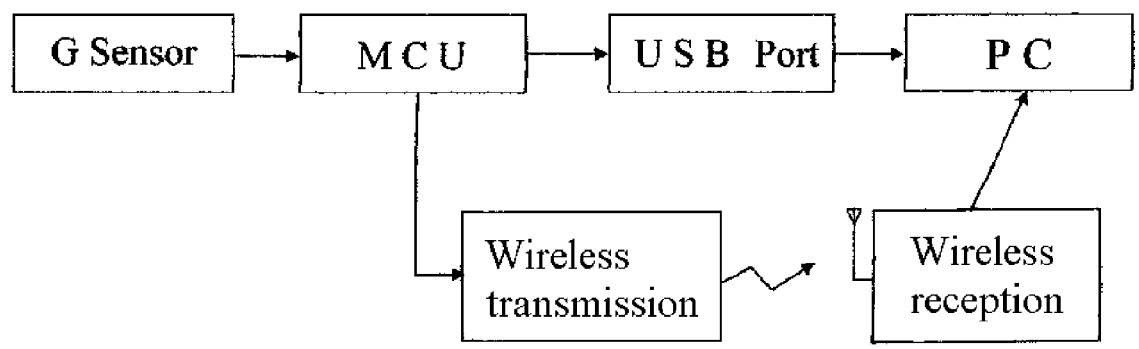
FIG. 4 is gravity mouse disclosed in TW Pat. Appl. No. 90221010.
Figure 5:
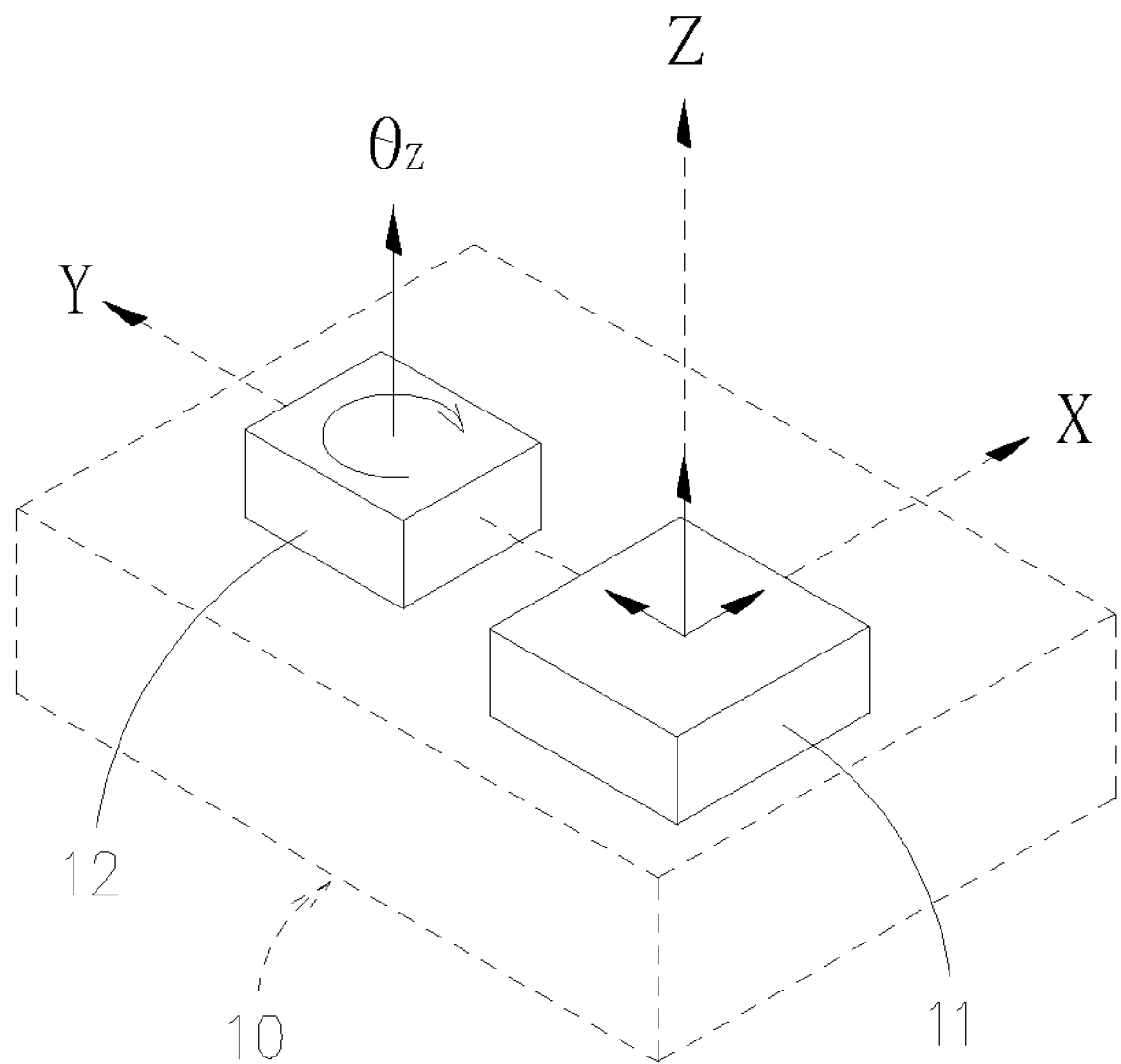
FIG. 5 shows an inertial sensing input apparatus of the invention, being defined in three perpendicular directions with respect to a Cartesian coordinate system of X-, Y-, and Z-axes.
Figure 6:
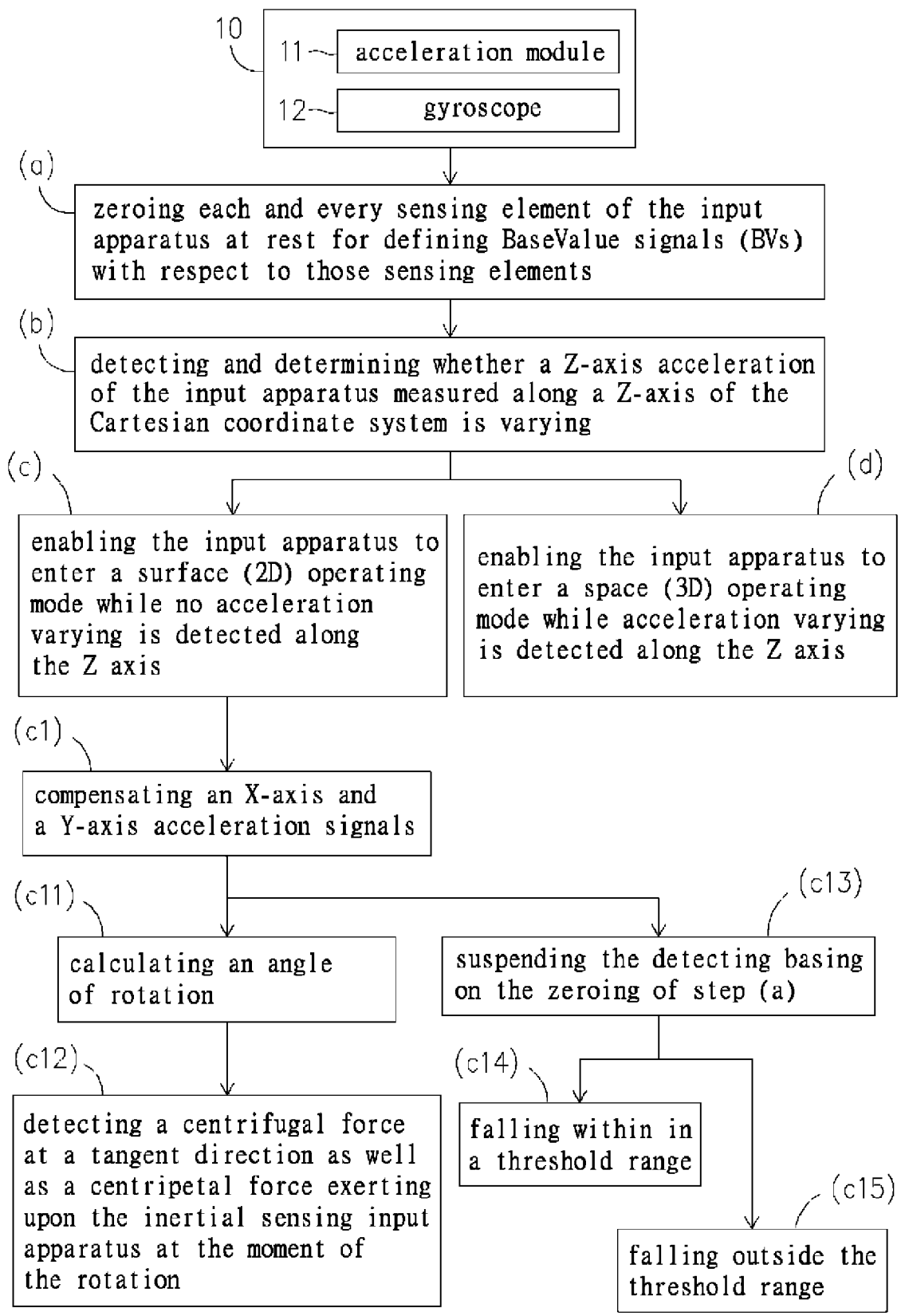
FIG. 6 is a flow chart depicting steps of an inertial sensing input method of the invention.

Please refer to FIG. 5 and FIG. 6, which show an inertial sensing input apparatus of the invention, being defined in three perpendicular directions with respect to a Cartesian coordinate system of X-, Y-, and Z-axes, and a method thereof. As seen in FIG. 5, an inertial sensing input apparatus 10 is comprised of: an accelerometer module 11, structured with at least three accelerometers for detecting accelerations in three perpendicular directions with respect to a Cartesian coordinate system of X-, Y-, and Z-axes and generating an X-axis, a Y-axis and a Z-axis acceleration signals accordingly; and a gyroscope 12, used for detecting a rotation of the inertial sensing input apparatus 10 measured with respect to the Z-axis and generating an angular velocity signal accordingly. It is noted that the acceleration module 11 can be a device selected from the group consisting of a modulized structure, a combined structure configuring with accelerometers for measuring three axes of a space respectively and independently, and the combination thereof. As seen in FIG. 6, the flow chart of an inertial sensing input method of the invention is shown as following:

Step (a): zeroing an X-axis accelerometer, a Y-axis accelerometer, a Z-axis accelerometer and a gyroscope of an inertial sensing input apparatus at rest by means of averaging for defining BaseValue signals (BVs) with respect to those sensing elements, i.e. BVx, BVy, BVz, BVw, whereas the X-axis accelerometer, the Y-axis accelerometer, the Z-axis accelerometer are being arranged to detect accelerations of an inertial sensing input apparatus in three perpendicular directions with respect to a Cartesian coordinate system of X-, Y-, and Z-axes, and BVx is being defined as the average of a plurality of successive acceleration signals detected by the X-axis accelerometer, and same as BVy, BVz, BVw to the Y-axis accelerometer, the Z-axis accelerometer and the gyroscope in respective.

Step (b): using the Z-axis accelerometer to detect and determine whether a Z-axis acceleration of the inertial sensing input apparatus measured along the Z-axis of the Cartesian coordinate system is varying during a specified period of time by defining the Z-axis acceleration of the inertial sensing input apparatus measured along the Z-axis as a motion signal z and thus comparing the motion signal z with the BVz of the Z-axis accelerometer so as to determine whether the acceleration of the inertial sensing input apparatus measured along the Z-axis is varying during the specified period of time while; that is, when a user lift the inertial sensing input apparatus from a surface, a so-defined value of (z−BVz) will exceed a predefined threshold value so as to enable the inertial sensing input apparatus to enter a space (3D) operating mode and act as a pointer or a presentation device.

Step (c): enabling the inertial sensing input apparatus to enter a surface (2D) operating mode while no acceleration varying is detected along the Z axis, i.e. the absolute value of (z−BVz) is smaller than the predefined threshold value, whereas the X-axis accelerometer and the Y-axis accelerometer are activated accordingly to detect an X-axis acceleration and a Y-axis acceleration in respective and thus generate an X-axis acceleration signal and a Y-axis acceleration signal correspondingly;

Step (c1): using the gyroscope to detect an unconscious rotation caused by a human operation as the inertial sensing input apparatus is being held to move on a planar surface in a human hand while generating an angular velocity signal w accordingly, and thus using the angular signal for compensating the X-axis acceleration signal and the Y-axis acceleration signal, and after compensating both the X-axis acceleration signal and the Y-axis acceleration signal, double integrating the compensated X-axis and the Y-axis acceleration signals to obtain a displacement for using the same to define movements of an object displayed on a screen of an interactive computer; and Step (d): enabling the input apparatus to enter a space (3D) operating mode while acceleration varying is detected along the Z axis, whereas the gyroscope is activated for detecting a rolling of the inertial sensing input apparatus while generating an angular velocity signal accordingly and the Y-axis accelerometer is activated for detecting a pitch of the inertial sensing input apparatus while generating another Y-axis acceleration signal accordingly.

It is inevitable that errors and noises will occur on the detection of those X-axis acceleration signals and the Y-axis acceleration signals after several surface operations that movements of the object will not be accurately defined. Therefore, it is required to compensate the X-axis acceleration signal and the Y-axis acceleration signal, which is detailed in the following steps:

Step (c11): integrating angular velocity of the inertial sensing input apparatus with respect to the angular velocity signal so as to obtain an angle of rotation θ for using the same to determine whether the inertial sensing input apparatus is rotating; i.e.

$$\theta = \int w \qquad (1)$$

Step (c12): detecting a centrifugal force $g_t$ at a tangent direction as well as a centripetal force $g_r$ exerting upon the inertial sensing input apparatus at the moment of the rotation, i.e.

$$g_t = R \times (w/dt) \qquad (2)$$

$$g_r = R \times w^2 \qquad (3)$$

wherein R is the distance between a rotation center and the accelerometer;

dt is a sampling interval that can be defined at random;

It is known that the acceleration detected by the X-axis accelerometer $g_x$ is the totality of an X-axis acceleration $g_{rx}$ caused by an actual displacement of the inertial sensing input apparatus at the X-axis and the centrifugal force $g_t$; i.e.

$$g_x = g_{rx} + g_t \qquad (4)$$

Thus, the X-axis acceleration $g_{rx}$ caused by the actual displacement of the inertial sensing input apparatus at the X-axis can be obtained by subtracting the centrifugal force $g_t$ from the acceleration detected by the X-axis accelerometer $g_x$.

Similarly, the acceleration detected by the Y-axis accelerometer $g_y$ is the totality of an Y-axis acceleration $g_{ry}$ caused by an actual displacement of the inertial sensing input apparatus at the Y-axis and the centripetal force $g_r$; i.e.

$$g_y = g_{ry} + g_r \qquad (5)$$

Thus, the Y-axis acceleration $g_{ry}$ caused by the actual displacement of the inertial sensing input apparatus at the Y-axis can be obtained by subtracting the centripetal force $g_r$ from the acceleration detected by the Y-axis accelerometer $g_y$.

Form the foregoing formulas (2)~(5), the accelerations ($g_{rx}$, $g_{ry}$) of the actual movement can be obtained, which are required to be compensated further for correcting errors caused by an unconscious rotation as the following formula:

$$\begin{bmatrix} g_{cx} \\ g_{cy} \end{bmatrix} = \begin{bmatrix} \cos\theta & \sin\theta \\ -\sin\theta & \cos\theta \end{bmatrix} \times \begin{bmatrix} g_{rx} \\ g_{ry} \end{bmatrix} \qquad (6)$$

In addition, a thresholding procedure is required to be performed upon the inertial sensing input apparatus when it is enabled to operate at the surface (2D) operating mode as that shown in step (c), which is comprises the step of:

Step (c13): suspending the detecting based on the zeroing of step (a) and examining whether a plurality of successive X-axis and the Y-axis acceleration signals, stored in advanced in the inertial sensing input apparatus, are all fallen inside a threshold range;

Step (c14): averaging the plural successive X-axis and the Y-axis acceleration signals and replacing the BVs by the averaged X-axis and the Y-axis acceleration signals in respective when all of which fall inside the threshold range; and Step (c15): performing no addition operation when all of which are not fallen inside the threshold range.

It is noted that the amount of the successive X-axis and the Y-axis acceleration signals being stored in the inertial sensing input apparatus should be dependent upon the size of the apparatus as well as actual requirement. For instance, the inertial sensing input apparatus can be defined to perform the aforesaid thresholding procedure after ten successive X-axis signals and ten successive Y-axis signals are detected and stored while defined the threshold range to be [−3, +3]. Thus, when all those ten X-axis signals and ten Y-axis signals fall within the defined threshold range of [−3, +3], they are being averaged while replacing the previous BVs by the average value in respective so as to eliminate the adverse effect cause by unconscious rotation as the inertial sensing input apparatus is being held to move on a planar surface in a human hand as well as the interferences caused by the electronic noises generated from the inertial sensing elements.

The processed X- and Y-axis acceleration signals ($g_{cx}$, $g_{cy}$) are double integrated to obtain the position values, which are mapped to computer screen coordinates representing the cursor position.

To sum up, the present invention can provide an inertial sensing input apparatus, configured with accelerometer and gyroscope for adapting itself to be operative no matter the input apparatus is being held to operate on a planar surface or in a free space by selectively enabling the input apparatus to operate in a mode of two-dimensional (2D) detection or in a mode of three-dimensional (3D) detection, in which the gyroscope is activated to detect a rotation of the input apparatus caused when the input apparatus is being held to move and thus generates an angular velocity signal correspondingly for compensating the unconscious rotation caused by a human operation. Also the interferences caused by the electronic noises generated from the accelerometer or the electronic circuit are removed by thresholding, so that the inertial sensing input apparatus of the invention is freed from the shortcomings of prior-art inertial input apparatus using only accelerometer and it is a device that can be handle smoothly and naturally.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An inertial sensing input apparatus, comprising:
   an acceleration module, structured with at least three accelerometers for detecting accelerations in three perpendicular directions with respect to a Cartesian coordinate system of X-, Y-, and Z-axes; and
   a gyroscope, used for detecting a rotation measured with respect to the Z-axis;
   wherein, an angle of rotation is obtained by integrating an angular velocity of the rotation detected by the gyroscope while calculating a centrifugal force as well as a centripetal force exerting upon the inertial sensing input apparatus when the rotation so as to using those for compensating acceleration signals measured along the X-axis and the Y-axis and thereafter defining movements of an object displayed on a screen of an interactive computer by the use of the compensated acceleration signals;
   wherein one accelerometer of the acceleration module, referring hereinafter as a Z-axis accelerometer, is being enabled for detecting an acceleration with respect to the Z-axis while the inertial sensing input apparatus is experiencing an up-and down displacement and thus selecting an operating mode for the inertial sensing input apparatus accordingly; and
   wherein the operating mode of the inertial sensing input apparatus includes:
   a surface (2D) operating mode, by which two accelerometers of the acceleration module, referring hereinafter as an X-axis accelerometer and a Y-axis accelerometer, are activated accordingly to detect an X-axis acceleration and a Y-axis acceleration in respective and thus generate an X-axis acceleration signal and a Y-axis acceleration signal correspondingly; and
   a space (3D) operating mode, by which the gyroscope is activated for detecting a rolling of the inertial sensing input apparatus while generating an angular velocity signal accordingly and the Y-axis accelerometer is activated for detecting a pitch of the inertial sensing input apparatus while generating another Y-axis acceleration signal accordingly.

2. The apparatus of claim 1, wherein the X-axis accelerometer is disabled when the inertial sensing input apparatus is operating in the space (3D) operating mode.

3. The apparatus of claim 1, wherein the acceleration module is a device selected from the group consisting of a modulized structure, a combined structure configuring with accelerometers for measuring three axes of a space respectively and independently, and the combination thereof.

4. An inertial sensing input method, comprising the steps of:
   (a) zeroing an X-axis accelerometer, a Y-axis accelerometer, a Z-axis accelerometer and a gyroscope of an inertial sensing input apparatus at rest for defining BaseValue signals (BVs) with respect to those sensing elements, whereas the X-axis accelerometer, the Y-axis accelerometer, the Z-axis accelerometer are being arranged to detect accelerations of an inertial sensing input apparatus in three perpendicular directions with respect to a Cartesian coordinate system of X-, Y-, and Z-axes;
   (b) using the Z-axis accelerometer to detect and determine whether a Z-axis acceleration of the inertial sensing input apparatus measured along the Z-axis of the Cartesian coordinate system is varying during a specified period of time;
   (c) enabling the inertial sensing input apparatus to enter a surface (2D) operating mode while no acceleration varying is detected along the Z axis, whereas the X-axis accelerometer and the Y-axis accelerometer are activated accordingly to detect an X-axis acceleration and a Y-axis acceleration in respective and thus generate an X-axis acceleration signal and a Y-axis acceleration signal correspondingly; and
   (d) enabling the input apparatus to enter a space (3D) operating mode while acceleration varying is detected along the Z axis, whereas the gyroscope is activated for detecting a rolling of the inertial sensing input apparatus while generating an angular velocity signal accordingly and the Y-axis accelerometer is activated for detecting a pitch of the inertial sensing input apparatus while generating another Y-axis acceleration signal accordingly.

5. The method of claim 4, wherein the step (b) of the method further comprises the step of:
   defining the Z-axis acceleration of the inertial sensing input apparatus measured along the Z-axis as a motion signal and thus comparing the motion signal with the BVz of the Z-axis accelerometer so as to determine whether the acceleration of the inertial sensing input apparatus measured along the Z-axis is varying during the specified period of time.

6. The method of claim 4, wherein the step (C) of the method, in that the inertial sensing input apparatus is enabled to operate at the surface (2D) operating mode, further comprises the step of:
   (c1) using the gyroscope to detect an unconscious rotation caused by a human operation as the inertial sensing input apparatus is being held to move on a planar surface in a human hand while generating an angular velocity signal accordingly, and thus using the angular signal for compensating the X-axis acceleration signal and the Y-axis acceleration signal.

7. The method of claim 6, wherein the compensating of the X-axis acceleration signal and the Y-axis acceleration signal, as that of step (c1), further comprises steps of:
   (c11) integrating angular velocity of the inertial sensing input apparatus with respect to the angular velocity signal so as to obtain an angle of rotation; and
   (c12) detecting a centrifugal force at a tangent direction as well as a centripetal force exerting upon the inertial sensing input apparatus at the moment of the rotation.

8. The method of claim 7, wherein the rotation angle, the centrifugal force and the centripetal force acquired by the gyroscope are used in a calculation for canceling out a rotation error contained in a combined acceleration signal integrating the X-axis and the Y-axis acceleration signals, and thus by the calculation, an rotation error caused by the unconscious rotation is compensated.

9. The method of claim 8, wherein the step of compensating the X-axis acceleration signal and the Y-axis acceleration signal further comprises the steps of:
   calculating the X-axis acceleration caused by an displacement of the inertial sensing input apparatus at the X-axis by subtracting effect of the centrifugal force from the acceleration detected by the X-axis accelerometer;
   calculating the Y-axis acceleration caused by an displacement of the inertial sensing input apparatus at the Y-axis by subtracting effect of the centripetal force from the acceleration detected by the X-axis accelerometer; and
   compensating the X-axis acceleration signal and the Y-axis acceleration signal.

10. The method of claim 9, wherein the compensating of the X-axis acceleration signal and the Y-axis acceleration signal is achieved by the following formula:

$$\begin{bmatrix} g_{cx} \\ g_{cy} \end{bmatrix} = \begin{bmatrix} \cos\theta & \sin\theta \\ -\sin\theta & \cos\theta \end{bmatrix} \times \begin{bmatrix} g_{rx} \\ g_{ry} \end{bmatrix}$$

wherein $g_{cx}$ is the acceleration measured along the X-axis after being compensated;
   $g_{cy}$ is the acceleration measured along the Y-axis after being compensated;
   θ is the angle of rotation;
   $g_{rx}$ is the X-axis acceleration caused by an displacement of the inertial sensing input apparatus at the X-axis; and
   $g_{ry}$ is the Y-axis acceleration caused by an displacement of the inertial sensing input apparatus at the Y-axis.

11. The method of claim 6, wherein after the (c1) step, the method further comprises the step of:
   double integrating the compensated X-axis and the Y-axis acceleration signals to obtain a displacement for using the same to define movements of an object displayed on a screen of an interactive computer.

12. The method of claim 4, wherein the step (C) of the method, in that the inertial sensing input apparatus is enabled to operate at the surface (2D) operating mode, further comprises the step of:
   (c13) suspending the detecting based on the zeroing of step (a) and examining whether a plurality of successive X-axis and the Y-axis acceleration signals, stored in advanced in the inertial sensing input apparatus, are all fallen inside a threshold range;
   (c14) averaging the plural successive X-axis and the Y-axis acceleration signals and replacing the BVs by the averaged X-axis and the Y-axis acceleration signals in respective when all of which fall inside the threshold range; and (c15) performing no addition operation when all of which are not fallen inside the threshold range.

13. The method of claim 12, wherein the amount of the successive X-axis and the Y-axis acceleration signals being stored in the inertial sensing input apparatus is dependent upon the size of the apparatus as well as actual requirement.

14. The method of claim 12, wherein the threshold range is dependent upon the size of the apparatus as well as actual requirement.

* * * * *